(12) United States Patent
Shem-Tov et al.

(10) Patent No.: US 11,900,104 B2
(45) Date of Patent: Feb. 13, 2024

(54) METHOD AND SYSTEM FOR IDENTIFYING AND REMOVING DEAD CODES FROM A COMPUTER PROGRAM

(71) Applicant: vFunction, Inc., Menlo Park, CA (US)

(72) Inventors: Doron Shem-Tov, Herzliya (IL); Amir Rapson, Shoham (IL); Ori Saporta, Givatayim (IL)

(73) Assignee: VFUNCTION, INC., Menlo Park, CA (US)

( * ) Notice: Subject to any disclaimer, the term of this patent is extended or adjusted under 35 U.S.C. 154(b) by 15 days.

(21) Appl. No.: 17/511,055

(22) Filed: Oct. 26, 2021

(65) Prior Publication Data

US 2023/0126399 A1    Apr. 27, 2023

(51) Int. Cl.
    *G06F 8/72*    (2018.01)
    *G06F 8/75*    (2018.01)

(52) U.S. Cl.
    CPC . *G06F 8/72* (2013.01); *G06F 8/75* (2013.01)

(58) Field of Classification Search
    CPC ................................... G06F 8/72; G06F 8/75
    See application file for complete search history.

(56) References Cited

U.S. PATENT DOCUMENTS

| | | | |
|---|---|---|---|
| 7,222,341 B2 | 5/2007 | Forbes et al. | |
| 7,543,284 B2 | 6/2009 | Bolton et al. | |
| 7,945,902 B1 * | 5/2011 | Sahoo | G06F 9/44589 |
| | | | 714/48 |
| 8,930,884 B2 | 1/2015 | Joukov et al. | |
| 11,288,044 B1 * | 3/2022 | Abadi | G06F 8/75 |
| 2004/0079529 A1 | 4/2004 | Bartlett | |
| 2007/0006178 A1 | 1/2007 | Tan | |
| 2009/0177957 A1 | 7/2009 | Bouillet et al. | |
| 2011/0131191 A1 | 6/2011 | Szyperski et al. | |
| 2016/0041824 A1 * | 2/2016 | Bostick | G06F 8/72 |
| | | | 717/123 |
| 2016/0253185 A1 * | 9/2016 | Goldstein | G06F 8/75 |
| | | | 719/328 |

* cited by examiner

*Primary Examiner* — Wei Y Zhen
*Assistant Examiner* — Amir Soltanzadeh
(74) *Attorney, Agent, or Firm* — M&B IP Analysts, LLC

(57) ABSTRACT

A system and method for identifying and removing dead-code from a computer program of an independent service is provided. The method includes: retrieving information related to the code of the service, wherein the retrieved information includes at least static and dynamic dependencies information of classes of the service; constructing a static dependencies graph, wherein nodes of the static dependencies graph are classes, and directed edges depict static dependencies between classes; classifying classes based on the static dependencies; constructing a first subgraph to include classes classified as internal-pure-static (IPS) classes; detecting external-dead-class candidates by traversing the subgraph; adding external-dead-class candidates to a dead code cut (DCC) set; and removing at least one class included in the DCC set from the code of the service.

19 Claims, 6 Drawing Sheets

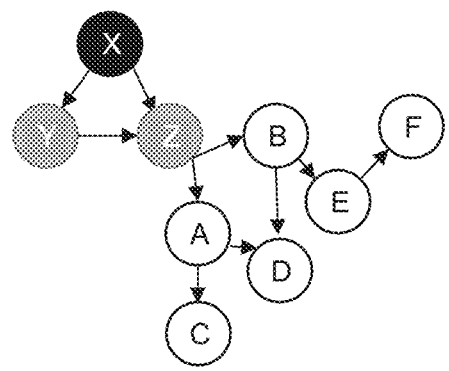
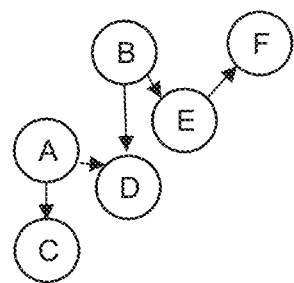
FIG. 5A
FIG. 5B
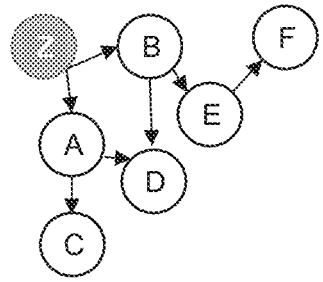
FIG. 5C
FIG. 5D

METHOD AND SYSTEM FOR IDENTIFYING AND REMOVING DEAD CODES FROM A COMPUTER PROGRAM

TECHNICAL FIELD

The present disclosure generally relates to software computer programs and more particularly to identifying dead code from computer programs.

BACKGROUND

Software applications and computer programs are large and complex. A large computer program includes a large number of code lines, as well as other program components, such as classes, libraries, and the like. The complexity of a computer program results from dependencies between program components, dependencies on internal resources, and dependencies on external resources. As such, not all services or functions in a computer program may be developed, deployed, and executed independently of each other. However, today, in modern distributed computing environments: engineering velocity, development agility, scalability, or performance advantages, may be gained by developing, deploying, and executing some services independently. For example, a service that requires frequent modifications or updates may be developed and deployed separately by a dedicated team, thereby reducing the development and testing cycle. From a performance perspective, a high-demand service may be allocated with more computing resources, such as CPU and memory, to improve such services.

As such, many organizations attempt to modernize and refactor their applications, so as to be able to support rapid changes in such applications and to enable execution over modern distributed computing environments (e.g., cloud). Part of the modernization and refactoring process is to remove code that can be considered as dead codes.

Dead code is a piece that was once actively used, but no longer serves its purpose within a computer program. It has been identified that the presence of dead code may add unnecessary complexity and risk to modifying the computer program. To this aim, methods to remove dead-codes to reduce the complexity of computer programs are desired. However, it should be noted that removal of dead-codes should be tackled with caution, which may raise exceptions and unintended errors upon removal.

Theoretically unreachable dead-code, i.e., a piece of code in the service that is never referenced, can be detected through code-analysis tools. However, existing solutions find difficulty in distinguishing dead-code that lies within reachable code. More particularly, challenges exist in identifying dead-code that are reachable and/or provide for multiple services. Some program code (or a class) may be used to provide multiple services and only "dead" while executing one service and not to another. Removal of code serving multiple use-cases or programs may be problematic to the function of the applicable service.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying and removing dead-code from a computer program of an independent service. The method comprises: retrieving information related to the code of the service, wherein the retrieved information includes at least static and dynamic dependencies information of classes of the service; constructing a static dependencies graph, wherein nodes of the static dependencies graph are classes, and directed edges depict static dependencies between classes; classifying classes based on the static dependencies; constructing a first subgraph to include classes classified as internal-pure-static (IPS) classes; detecting external-dead-class candidates by traversing the subgraph; adding external-dead-class candidates to a dead code cut (DCC) set; and removing at least one class included in the DCC set from the code of the service.

Certain embodiments disclosed herein also include a non-transitory computer readable medium having stored thereon causing a processing circuitry to execute a process, the process comprising: retrieving information related to the code of the service, wherein the retrieved information includes at least static and dynamic dependencies information of classes of the service; constructing a static dependencies graph, wherein nodes of the static dependencies graph are classes, and directed edges depict static dependencies between classes; classifying classes based on the static dependencies; constructing a first subgraph to include classes classified as internal-pure-static (IPS) classes; detecting external-dead-class candidates by traversing the subgraph; adding external-dead-class candidates to a dead code cut (DCC) set; and removing at least one class included in the DCC set from the code of the service.

Certain embodiments disclosed herein include a system for identifying and removing dead-code from a computer program of an independent service. The system comprises: a processing circuitry; and a memory, the memory containing instructions that, when executed by the processing circuitry, configure the system to: retrieve information related to the code of the service, wherein the retrieved information includes at least static and dynamic dependencies information of classes of the service; construct a static dependencies graph, wherein nodes of the static dependencies graph are classes, and directed edges depict static dependencies between classes; classify classes based on the static dependencies; construct a first subgraph to include classes classified as internal-pure-static (IPS) classes; detect external-dead-class candidates by traversing the subgraph; add external-dead-class candidates to a dead code cut (DCC) set; and remove at least one class included in the DCC set from the code of the service.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5A-5D are static dependencies graphs according to some embodiments.

DETAILED DESCRIPTION

Figure 1:
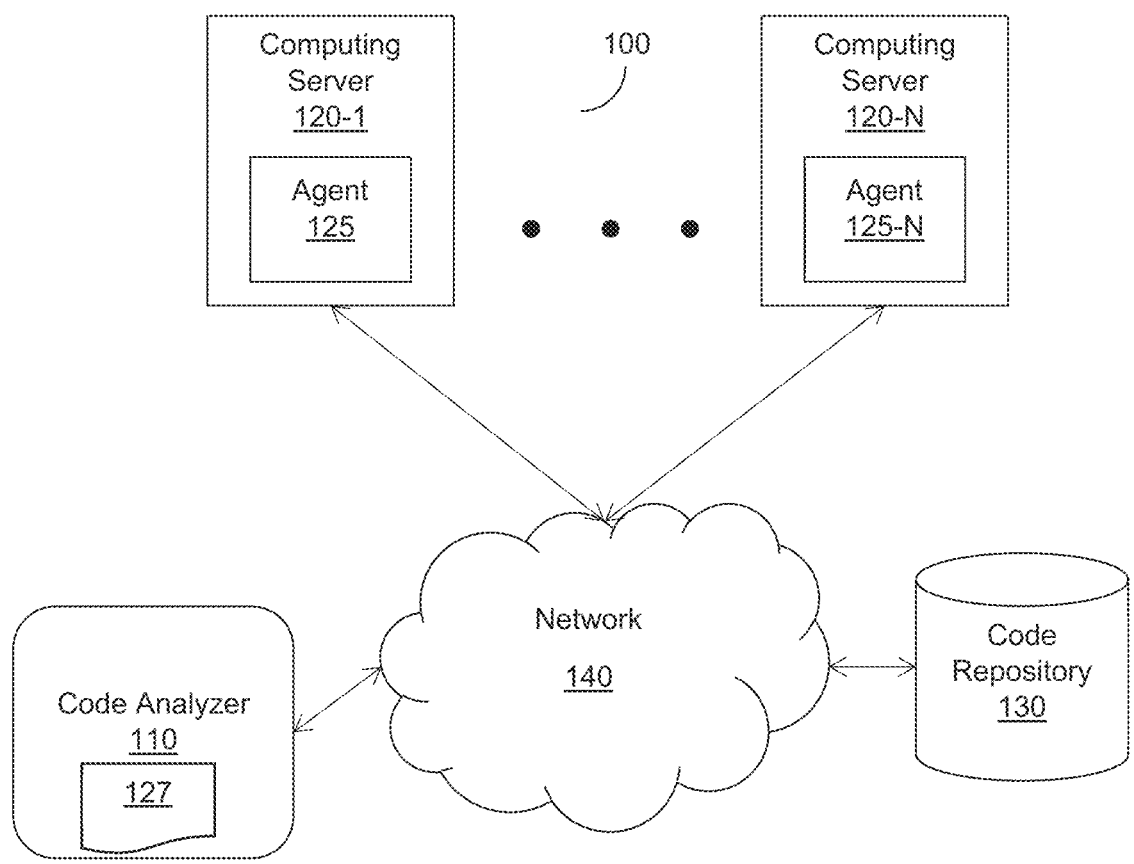
FIG. 1 is a network diagram depicting a network system utilized to disclose the embodiments for identifying and extracting dead codes (unused codes) from a computer program.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed provide method and system to effectively and accurately identify dead-code to improve the efficiency of a computer program. In particular, removal of such dead-code may improve software security reliability and ease their complexity. In an embodiment, a code analyzer has been configured to perform dynamic analysis that utilizes static and dynamic dependency information to identify unused codes (or classes) in the service. More particularly, static classes that may not be dynamically observed, but are still detectable, are identified and investigated further to identify potential dead code cuts. The statically observed pure-static classes are specifically distinguished by their dependencies to prevent the removal of pure-static classes that are being actively used. It has been identified that some codes may serve multiple services, and thus, dead-code need to be carefully identified and confirmed prior to removal. To this end, careful detection of pure-static dependencies is performed to determine and remove clearly unused dead-codes that will improve computer function without causing malfunctioning.

FIG. 1 is an example network diagram depicting a network system 100 utilized to disclose the embodiments for identifying and extracting services from a computer program. The system 100 includes and a code analyzer 110, one or more computing servers, 120-1 through 120-N (hereinafter "computing servers" 120 or "computing server" 120), and a code repository 130. Further, in the system 100, the various components listed are interconnected via a network 140.

The network 140 provides interconnectivity between the various components of the system. The network 140 may be, but is not limited to, a wireless, cellular, or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise-virtualized components, or a hybrid physical-virtual network, including both physical and virtualized components. Further, the network 140 may be configured to encrypt data, both at rest and in motion, and to transmit encrypted, unencrypted, or partially-encrypted data. Further, the network 140 may be configured to connect with the various components of the system 100 via any combination of wired and wireless means.

The computing servers 120 may include any type of computing resource configured to execute computer programs. A computer program may include a software application, a web application, a cloud application, a legacy software application, a process, a function, and the like, coded or programmed using a programming language such as may be programmed or coded using Java®, .NET, C++, and the like, or a scripting language, such as, as an example, Python.

A computing server 120 may be a physical machine or virtual machine. That is, a computing server 120 may execute a computer program in a virtual environment, such as a virtual machine, a software container, or a serverless infrastructure. The computing server 120 may include, without limitation, a web server, an application server, a database server, and the like.

A computer program is typically written in serial form. Such instructions may include methods, functions, or services, referred to as "services" or "a service," which perform a specific task for the computer program. During the execution of a computer program, each line of code, function, or both may typically be executed line-by-line in sequence. It should be noted that two or more servers 120 can execute the same instance or different instances of a computer program.

In an embodiment, each computing server 120 executing a computer program to be analyzed by the code analyzer 110 includes an agent 125 installed in the respective server 120. An agent 125 is a persistent piece of code installed and executed in a server 120. An agent 125, when executed by the server 120, is configured to retrieve code as well as runtime data of any computer program executed by the respective server 120 and provides such code to the analyzer 110. In another embodiment, the retrieved code may be stored in repository 130. The retrieved code may include, for example, binary code, readable source code, assembly code, byte code, or any other code level, such as, for example, Java bytecode or .NET CIL code.

The code analyzer 110, depicted in detail with respect to FIG. 6, below, is a system configured to execute instructions, organize information, and otherwise process data. The code analyzer 110 is configured to execute the methods and processes described herein below, other, like methods, and any combination thereof. Specifically, the code analyzer 110 is configured to perform static and dynamic analysis on the data collected from services. The dynamic analysis identifies dependencies in the program's code and may similarly identify dependencies between objects and classes as well as function calls in the computer program 127. An example for the dynamic analysis process is described in a U.S. patent application Ser. No. 16/872,977, assigned to the common assignee, which is hereby incorporated by reference for all it contains. In an embodiment, the code analyzer 110 receives the dependencies from a system configured to perform the dynamic analysis.

By way of non-limiting example, the operation of the code analyzer 110 will be discussed with reference to analyzing the computer program 127 executed over the computing server 120. The code of the computer program 127 is provided to the analyzer 110 by the agent 125 in the server 120. The code of the computer program 127 includes functions, classes, and methods, of one or more independent services. An independent service is a service or function that is part of the computer program 127, but can be extracted and executed independently of the computer program 127.

It should be noted that the code analyzer 110 may be deployed in on-premise configurations where the computing servers 120 are deployed. Alternatively, the code analyzer 110 may be deployed in a cloud computing platform. Other deployment options are also feasible.

Figure 2:
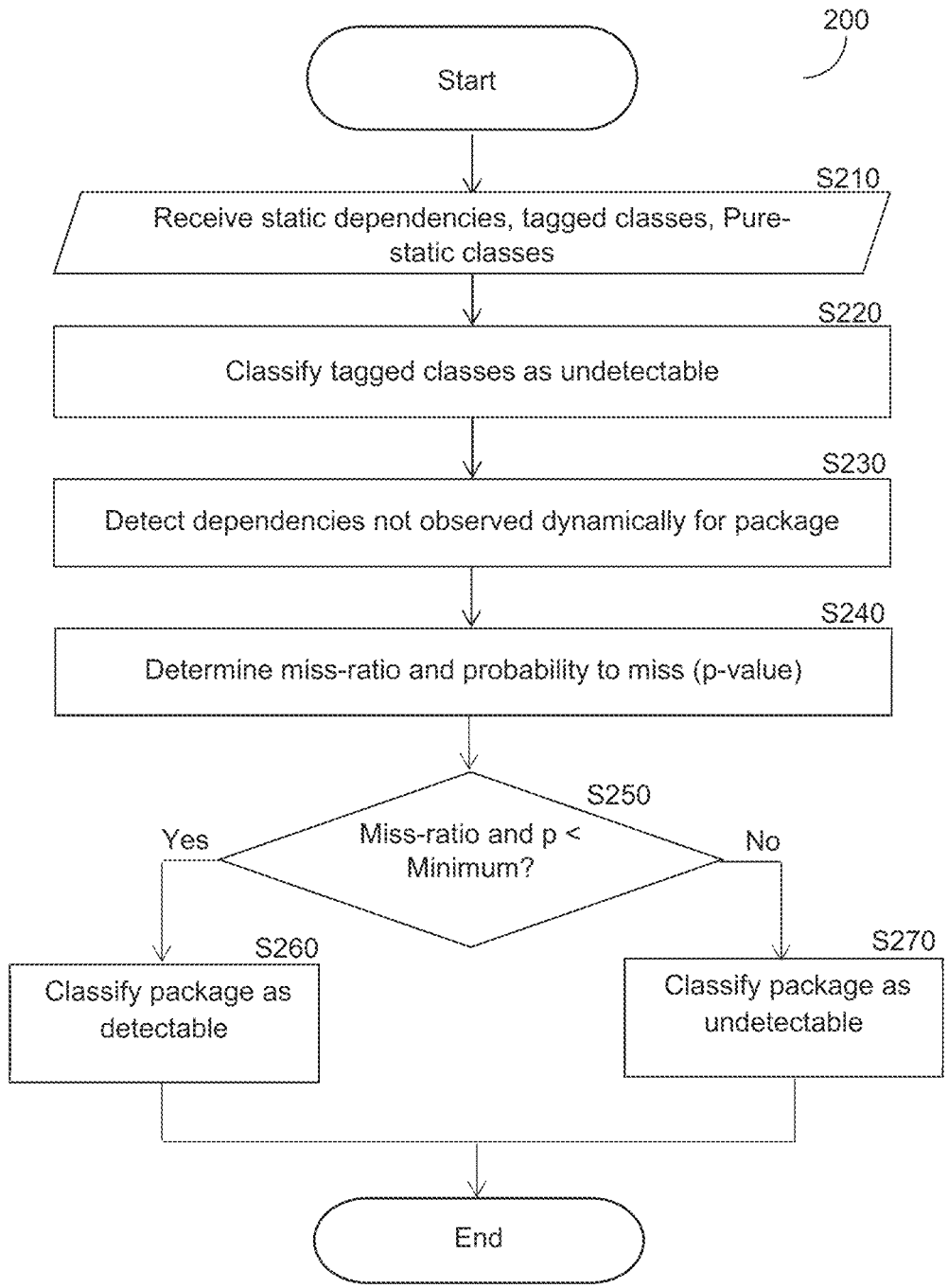
FIG. 2 is a flowchart illustrating a method for classifying detectable and undetectable packages according to an embodiment.

FIG. 2 is an example flowchart 200 illustrating a method for classifying detectable and undetectable packages according to an embodiment. A package includes related classes, which are pieces of codes executed in a computer program.

In an embodiment, classes are classified into two categories: detectable/undetectable. An undetectable class is a class with a high likelihood of being missed by the dynamic analysis process. Undetectable class objects can either be of types that does not run at all (e.g., interfaces) or types that are seldom observed due to short run times (e.g., entities) or types with low execution probability (e.g., abstract classes, exceptions). As such, undetectable classes are not accounted as evidence for dead-code.

Many pure-static classes in applications are sourced from generated or model packages. The dependencies of such classes are not considered dead-code in order to avoid false detection as classes that were not run. In an embodiment, the method of FIG. 2 is carried out for each package, where a package is a set of related classes for a particular type of task. The package may be part of the application or service.

At S210, static dependencies as observed by static analysis are received. In addition, tagged classes, and pure-static (PS) classes can be received. The information may be input by the code analyzer (e.g., 110, FIG. 1). In an embodiment, the tagged classes are, for example, interfaces, abstract classes, and entities, that are likely undetectable by dynamic sampling. The PS classes are those unobserved through dynamic analysis but are static dependencies of dynamic-seed classes.

At S220, the tagged classes are classified as undetectable. As likely undetectable classes, these tagged classes are classified as undetectable and are not analyzed through the following operation. On the contrary, in an embodiment, the pure-static classes in the computer program are sourced from generated or model packages. Thus, pure-static classes have no or very low runtime causing them to be often missed. Although such pure-static classes may not be dynamically detected, counting such classes as undetectable, and eventually as dead-code is undesirable.

At S230, the static dependencies that are not dynamically observed are detected for classes in a package. In an embodiment, each static dependencies for a class are iterated. In further embodiment, each static dependency that is not dynamically observed is counted as a miss for all classes within the package.

At S240, a miss-ratio and probability to miss (a p-value) is determined. In an embodiment, the counted number of miss relative to the expected miss is used to define the miss-ratio and further for a statistical test to find the p-value, indicating the probability to miss. In an embodiment, the p-value may be determined based on a probability of dynamically observing the dependencies.

At S250, a check is performed to compare the determined miss-ratio and a statistical test based on p-value against respective predetermined minimum values. If the miss-ratio and p-value is less than the predetermined minimum value, operation continues to S260, where the package is classified as detectable. Otherwise, the operation continues to S270, where the package is classified as undetectable. The predetermined minimum miss-ratio and p-value values balance false-positive and false negative undetectable packages. Note that S270, S280, and S280 are performed for each package.

In an embodiment, the processes are performed for each software package utilized by the application or service. A package may include a distribution of "miss-able" (i.e., dynamically not observed) and dynamically observable classes where a higher number of missed classes decrease the probability of dynamically observing static dependency in classes of the package. In an embodiment, classes in the undetectable package may be defined as undetectable classes. Furthermore, classes not classified as undetectable, may be eventually classified as detectable classes.

Figure 3:
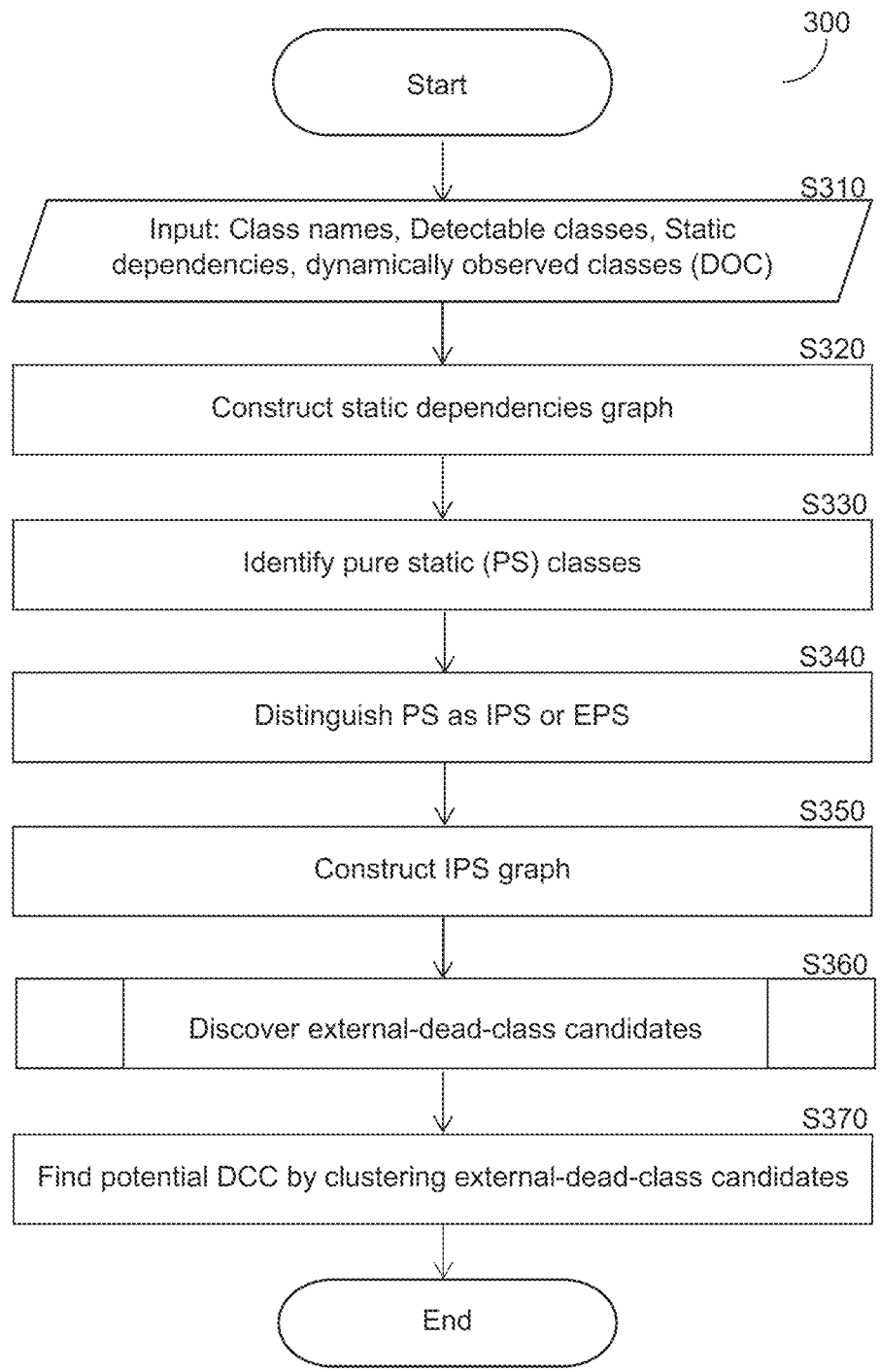
FIG. 3 is a flowchart illustrating a method for identifying a set of potential dead code cut (DCC) in a service according to an embodiment.

FIG. 3 is an example flowchart 300 illustrating a method for identifying a set of potential dead code cuts (DCC) in a service according to an embodiment.

At S310, an input of class names, detectable classes, static dependencies, and dynamically observed classes (DOC) are received. In an embodiment, the detectable classes are obtained as a result of the process of FIG. 2. The static dependencies of the services include a pair of class names, where classes can be dynamically observed or pure-static classes. The dynamically observed classes may be obtained from dynamic analysis. It should be noted that a pure-static (PS) class in one service may not be pure-static in all services of the same application.

At S320, the static dependencies graph (G) is constructed based on the received inputs. In an embodiment, the nodes in the graph indicate classes with directed edges indicating static dependencies between the classes. An example static dependencies graph, G, is shown in FIG. 5A, where each node with a letter (e.g., X, Y, Z, A, etc.) represents a class and arrows show static dependencies between the classes.

At S330, pure-static (PS) classes are identified based on input DOCs and static classes. The set of pure-static classes is a complementary set of the DOCs. As noted above, the pure-static classes in the computer program are sourced from generated or model packages. In addition, pure-static classes may be regular classes that were not sampled dynamically. In the example embodiment of FIG. 5A, class X is a DOC that depends on PS classes Y and Z, and furthermore, class Z directly depends on other PS classes A through F.

At S340, the identified PS classes are distinguished as either internal-pure-static (IPS) or external-pure-static (EPS) classes. In an embodiment, the IPS may be PS classes without a predecessor in DOCs. In a further embodiment, the EPS may be a complementary PS subset from which a DOC depends on. Such IPS dependencies may promote effective identification of dead-codes in that IPS classes display at least two levels of pure-static dependencies. Furthermore, the distinction of IPS and EPS classes prevents erroneous removal of a user class that depends on a dead class by being mistakenly classified as a dead class. Referring back to the example embodiment of FIG. 5A, PS classes Y and Z, from which the DOC X depends, may be identified as EPS; and PS classes A through F may be identified as IPS classes that have PS classes as predecessors and not a DOC.

At S350, an IPS graph, $G_{IPS}$, is constructed as a subgraph of G that depicts the IPS classes including their edges to show static dependencies. An example IPS graph, $G_{IPS}$, is shown in FIG. 5B only displaying the IPS classes and their dependencies.

At S360, external-dead-class candidates are discovered. The operation of S360 is described with respect to FIG. 4, below.

At S370, potential dead code cut (DCC) is found by clustering the discovered external-dead-class candidates. The DCC set includes classes that may be potentially cut (i.e., removed) from the computer program. It should be noted that clustering enables grouping of related classes in order to remove significant dead-code from the service together. In an embodiment, the DCC set is initialized to an empty set prior to populating with external-dead-class candidates.

In an embodiment, hierarchical clustering may be performed with a distance metric designed to cluster classes from external-dead-class candidates with Jaccard-similar $R_s$ sets, where $R_s$ is a reachable IPS class set, and further with example classes s1, s2 where $R_{s1}$ is highly contained in $R_{s2}$. Such clustering prevents clustering only classes with similar-sized reachable IPS class sets. Furthermore, related classes may be grouped together in order to remove significant dead-codes from the service. In an embodiment, the clustering may be stopped when the distances between the clusters are larger than a threshold distance to ensure a simple and understandable clustering criterion. In an embodiment, the threshold distance may be predefined and stored in a memory.

In an embodiment, the potential DCC set found by clustering may be true DCCs where the IPS dependencies may be cut from the dynamic seed when the cluster is removed from the graph. In another embodiment, the potential DCC set may not be true DCCs resulting IPS dependencies that are not cut from the dynamic-seed even with the removal of the cluster from the graph. It has been identified that an ideal DCC is a very small cut that allows the removal of a large dead subgraph from the dynamic-seed.

The true DCCs do not merely help find a large set of reachable IPS classes but provides information about the associated dead-codes. In an embodiment, all cut-off vertices are naturally removed from the service when cut classes are removed. In this scenario, all call-stacks of IPS classes must pass through at least one of the cut vertices, which supports the evidence of dead cut vertices. Furthermore, this evidence is strengthened with a larger ratio between cut-off IPS classes and cut vertices.

It should be noted that the removal of classes from a service may cause compliance errors unless preceded by an automatic refactoring of dependent classes, which may not always be desired. To this end, further processes to identify cut-off classes may be desired.

Figure 4:
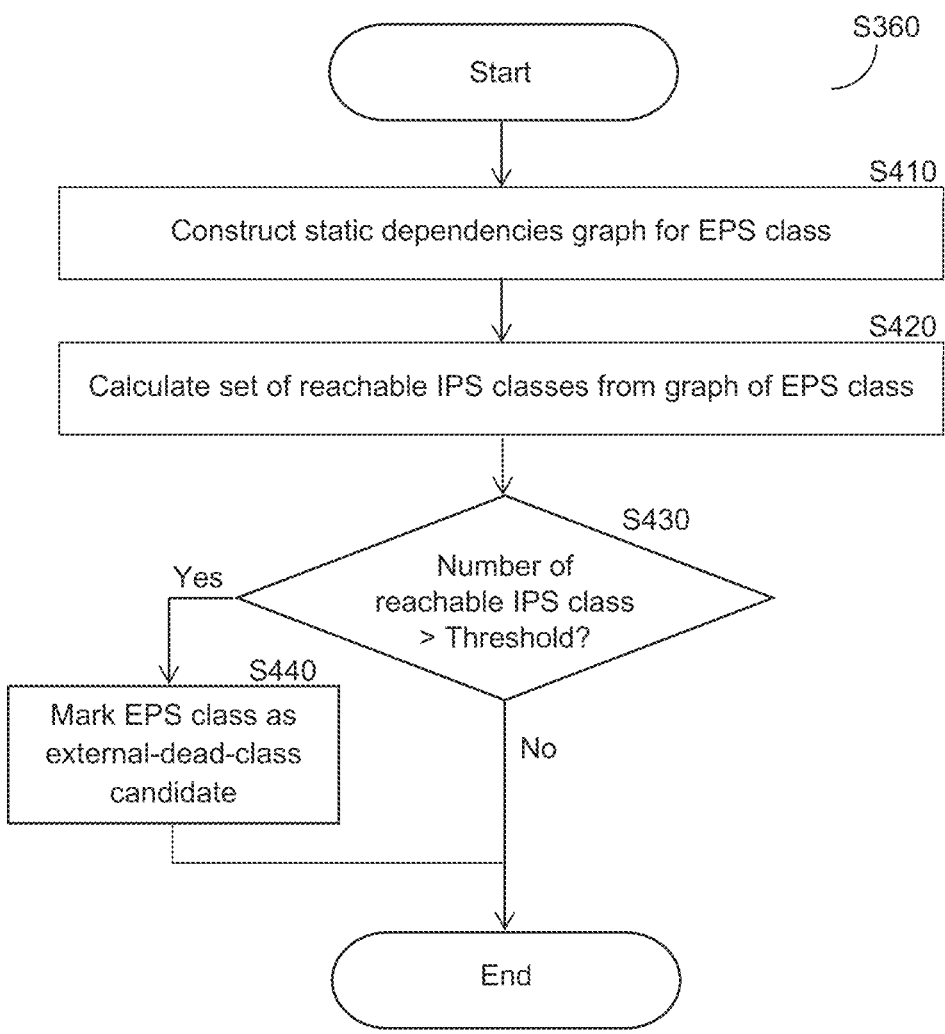
FIG. 4 is a flowchart illustrating a method for discovering external-dead-class candidates according to an embodiment.

FIG. 4 is an example flowchart S360 describing a method for discovering external-dead-class candidates according to an embodiment is disclosed.

At S410, a static dependencies graph, $G_{IPS}(s)$ for each EPS class, s, is constructed by adding the EPS class to $G_{IPS}$ including all edges from s to IPS classes. An example static dependencies graph for classes Z, $G_{IPS}(Z)$, and Y, $G_{IPS}(Y)$, are shown in FIGS. 5C and 5D, respectively.

At S420, a set of reachable IPS classes, $R_s$, are calculated from the constructed graph for each EPS class, $G_{IPS}(s)$.

In the example embodiment of FIGS. 5C and 5D, $R_Z$ includes IPS classes A through F and $R_Y$ is empty since no IPS classes are associated with class Y. It should be noted that static dependencies graphs shown in FIGS. 5A-5D are presented as examples for understanding the principles of the disclosure only.

At S430, a check is performed whether the number of reachable IPS classes, $\|R_s\|$, is greater than a preconfigured threshold value. If yes, the operation continues to S440. Otherwise, the operation continues to S450. It should be noted that the set of reachable IPS classes includes IPS classes that are also detectable. At S440, the EPS class is marked as an external-dead-class candidate to be added to a DCC set, otherwise, the operation ends.

Figure 6:
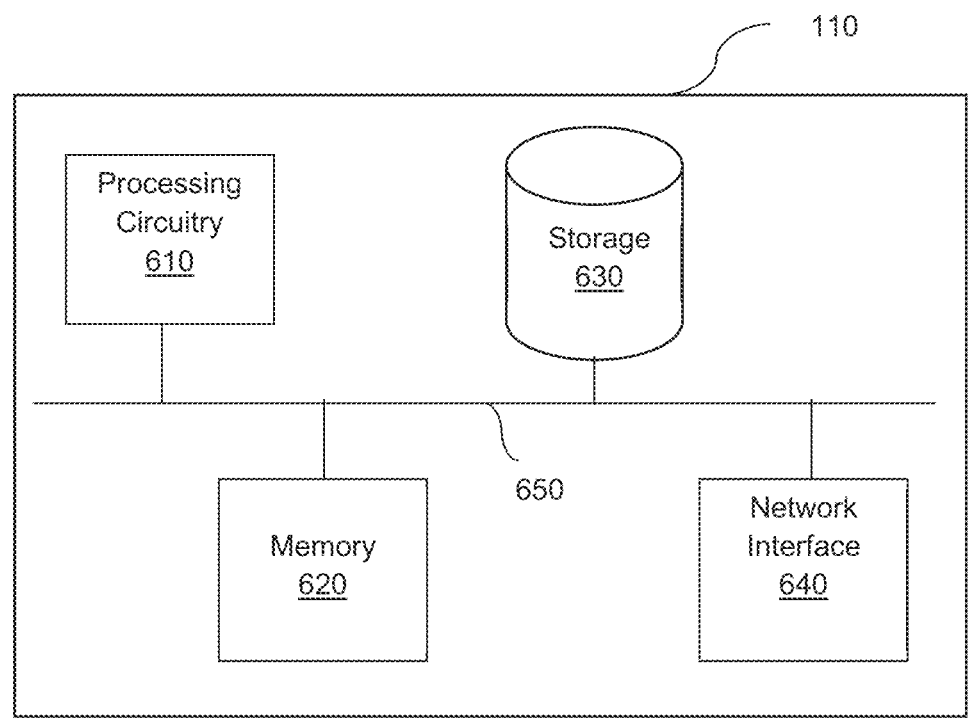
FIG. 6 is a block diagram of a code analyzer according to an embodiment.

FIG. 6 is an example schematic diagram of the code analyzer 110, according to an embodiment. The code analyzer 110 includes a processing circuitry 610 coupled to a memory 620, a storage 630, and a network interface 640. In an embodiment, the components of the code analyzer 110, may be communicatively connected via a bus 650.

The processing circuitry 610 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read-only memory, flash memory, etc.), or a combination thereof.

In one configuration, software for implementing one or more embodiments disclosed herein may be stored in storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and maybe realized, for example, as flash memory or another memory technology, compact disk-read only memory (CD-ROM), Digital Versatile Disks (DVDs), or any other medium which can be used to store the desired information.

The network interface 640 allows the analyzer 110, to communicate with the various servers (e.g., servers 120), a user device, or both for requesting service creation and providing additional input.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identifying and removing a dead-code from a computer program of an independent service, comprising:
    retrieving information related to a code of a service, wherein the retrieved information includes at least static and dynamic dependencies information of classes of the service;
    constructing a static dependencies graph, wherein nodes of the static dependencies graph are classes, and directed edges depict static dependencies between classes;
    classifying classes based on the static dependencies;
    constructing a first subgraph to include classes classified as internal-pure-static (IPS) classes, wherein the IPS classes includes two level of pure-static (PS) dependencies;
    detecting at least one external-dead-class candidates by traversing the first subgraph for a set of reachable IPS classes, wherein detecting further comprises:
        constructing a second subgraph, wherein the second subgraph includes the IPS classes designated in the first subgraph and at least one external-pure-static (EPS) class having dependency on the IPS classes;
        generating the set of reachable IPS classes from the IPS classes of the first subgraph; and
        determining the at least one EPS class as the at least one external-dead-class candidate when a number of classes in the set of reachable IPS classes is greater than a preconfigured threshold value;
    adding the detected at least one external-dead-class candidates to a dead code cut (DCC) set;
    removing at least one class included in the DCC set from the code of the service in order to create a reduced code of the service; and
    causing an execution of the computer program via a processor using the reduced code of the service, thereby improving efficiency and security of the computer program.

2. The method of claim 1, wherein the classified classes are at least one of: a dynamically observable class (DOC), an external-pure-static (EPS) class, and an IPS class, wherein the DOC has dependency on the EPS class.

3. The method of claim 1, wherein the retrieved information comprises: a set of class names in the service, at least one subset of detectable classes, a list of static dependencies, and a set of dynamically observable classes (DOCs).

4. The method of claim 2, further comprising:
    clustering the at least one external-dead-class candidates added to the DCC set with Jaccard-similar sets of reachable IPS classes; and
    removing the clustered at least one external-dead-class candidates from the code of the service.

5. The method of claim 2, further comprising:
    detecting, based on the static dependencies and a dynamic analysis, dynamically observed dependencies for classes in a package, wherein the classes in the package includes the DOCs and miss-able classes;
    determining for the package at least one of: a miss-ratio and a p-value; and
    identifying a detectable package based on at least of the determined miss-ratio and the p-value, wherein the detectable package includes a subset of detectable classes.

6. The method of claim 5, wherein the detectable package includes at least one of: the miss-ratio and the p-value less than predetermined minimum values.

7. The method of claim 5, further comprising:
    identifying an undetectable package based on at least one of: the miss-ratio and the p-value equal, wherein the undetectable package includes undetectable classes.

8. The method of claim 5, wherein the miss-ratio is a number of misses relative to expected misses, wherein the p-value is a probability for a class to be missed in the dynamic analysis, and wherein the number of misses is a count for each static dependency that is not dynamically observed.

9. The method of claim 5, wherein the p-value is determined based on a probability of dynamically observing the dependencies.

10. A non-transitory computer readable medium having stored thereon instructions for causing a processing circuitry to execute a process, the process comprising:
    retrieving information related to a code of a service, wherein the retrieved information includes at least static and dynamic dependencies information of classes of the service;
    constructing a static dependencies graph, wherein nodes of the static dependencies graph are classes, and directed edges depict static dependencies between classes;

classifying classes based on the static dependencies;
constructing a first subgraph to include classes classified as internal-pure-static (IPS) classes, wherein the IPS classes includes two level of pure-static (PS) dependencies;
detecting at least one external-dead-class candidates by traversing the first subgraph for a set of reachable IPS classes, wherein detecting further comprises:
    constructing a second subgraph, wherein the second subgraph includes IPS classes designated in the first subgraph and at least one external-pure-static (EPS) class having dependency on the IPS classes;
    generating the set of reachable IPS classes from the IPS classes of the first subgraph; and
    determining the at least one EPS class as an external-dead-class candidate when a number of classes in the set of reachable IPS classes is greater than a preconfigured threshold value;
adding the detected at least one external-dead-class candidates to a dead code cut (DCC) set;
removing at least one class included in the DCC set from the code of the service in order to create a reduced code of the service; and
causing an execution of a computer program via a processor using the reduced code of the service, thereby improving efficiency and security of the computer program.

11. A system for identifying and removing a dead-code from a computer program of an independent service, comprising:
a processing circuitry; and
a memory, the memory containing instructions that, when executed by the processing circuitry, configure the system to:
retrieve information related to code of a service, wherein the retrieved information includes at least static and dynamic dependencies information of classes of the service;
construct a static dependencies graph, wherein nodes of the static dependencies graph are classes, and directed edges depict static dependencies between classes;
classify classes based on the static dependencies;
construct a first subgraph to include classes classified as internal-pure-static (IPS) classes, wherein the IPS classes includes two level of pure-static (PS) dependencies;
detect at least one external-dead-class candidates by traversing the first subgraph for a set of reachable IPS classes;
    construct a second subgraph, wherein the second subgraph includes IPS classes designated in the first subgraph and at least one external-pure-static (EPS) class having dependency on the IPS classes;
    generate the set of reachable IPS classes from the IPS classes of the first subgraph and;
    determine the at least one EPS class as an external-dead-class candidate when a number of classes in the set of reachable IPS classes is greater than a preconfigured threshold value;
add the detected at least one external-dead-class candidates to a dead code cut (DCC) set;
remove at least one class included in the DCC set from the code of the service in order to create a reduced code of the service; and
cause an execution of the computer program via a processor using the reduced code of the service, thereby improving efficiency and security of the computer program.

12. The system of claim 11, wherein the classified classes are at least one of: a dynamically observable class (DOC), an external-pure-static (EPS) class, and an IPS class, wherein the DOC has dependency on the EPS class.

13. The system of claim 11, wherein the retrieved information comprises: a set of class names in the service, at least one subset of detectable classes, a list of static dependencies, and a set of dynamically observable classes (DOCs).

14. The system of claim 12, wherein the system is further configured to:
cluster the at least one external-dead-class candidates added to the DCC set with Jaccard-similar sets of reachable IPS classes; and
remove the clustered at least one external-dead-class candidates from the code of the service.

15. The system of claim 12, wherein the system is further configured to:
detect, based on the static dependencies and a dynamic analysis, dynamically observed dependencies for classes in a package, wherein the classes in the package includes the DOCs and miss-able classes;
determine for the package at least one of: a miss-ratio and a p-value; and
identify a detectable package based on at least of the determined miss-ratio and the p-value, wherein the detectable package includes a subset of detectable classes.

16. The system of claim 15, wherein the detectable package includes at least one of: the miss-ratio and the p-value less than predetermined minimum values.

17. The system of claim 15, wherein the system is further configured to:
identify an undetectable package based on at least one of: the miss-ratio and the p-value equal, wherein the undetectable package includes undetectable classes.

18. The system of claim 15, wherein the miss-ratio is a number of misses relative to expected misses, wherein the p-value is a probability for a class to be missed in the dynamic analysis, and wherein the number of misses is a count for each static dependency that is not dynamically observed.

19. The system of claim 15, wherein the p-value is determined based on a probability of dynamically observing the dependencies.

* * * * *